Aug. 1, 1972        C. SNELLING        3,681,221

PHOTOELECTROPHORETIC IMAGING BY PHOSPHORESCENCE

Filed April 27, 1970

INVENTOR.
CHRISTOPHER SNELLING

BY Donald C. Roland

ATTORNEY

United States Patent Office 3,681,221
Patented Aug. 1, 1972

3,681,221
PHOTOELECTROPHORETIC IMAGING BY PHOSPHORESCENCE
Christopher Snelling, Penfield, N.Y., assignor to Xerox Corporation, Rochester, N.Y.
Filed Apr. 27, 1970, Ser. No. 32,238
Int. Cl. G03g 13/22
U.S. Cl. 204—181                                                    4 Claims

ABSTRACT OF THE DISCLOSURE

There is disclosed a photoelectrophoretic imaging system utilizing a phosphorescent energy source to provide the necessary radiation for imaging. In response to radiation emitted from the particular energy source the photoelectrophoretic particles present in the imaging suspension are effected in such a manner so as to produce an image.

BACKGROUND OF THE INVENTION

This invention relates to an imaging system and more specifically to a phosphorescent imaging system.

In photoelectrophoretic imaging colored photosensitive particles are suspended in an insulating carrier liquid. This suspension is then placed between at least two electrodes subjected to a potential difference and exposed to a light image. Ordinarily, in carrying out the process the imaging suspension is placed on a transparent electrically conductive support in the form of a thin film and exposure is made through the transparent support while a second generally cylindrically shaped biased electrode is rolled across the suspension. The particles are believed to bear an initial charge once suspended in the liquid carrier which causes them to be attracted to the transparent electrode and upon exposure, to change polarity so that the exposed particles migrate to the second or roller electrode thereby forming images on each of the electrodes by particle subtraction each image being complementary one to the other. The process may be used to produce both polychromatic and monochromatic images. In the latter instance a single color photoresponsive particle may be used in the suspension or a number of differently colored photoresponsive particles may be used all of which respond to the radiation to which the suspension is exposed. An extensive and detailed description of the photoelectrophoretic imaging techniques generally referred to may be found in U.S. Pat. Nos. 3,383,993, 3,384,488, 3,384,565 and 3,384,566 which are herein incorporated by reference.

Although it has been found that high quality images may be obtained in electrophoretic imaging as discussed above, it is generally required that simultaneous electric field application and exposure be utilized necessitating the use of a transparent conductive electrode. In addition, the images are conventionally produced with the use of incandescent light sources and the optical projection of an image onto the photosensitive pigment suspension. Although generally satisfactory for most reproduction purposes there are situations which generally require less complex optics and greater system flexibility eliminating, for example, the need for the use of transparent electrodes and simultaneous exposure and field application.

It is, therefore, an object of this invention to provide an imaging system which will overcome the above noted disadvantages.

It is a further object of this invention to provide a novel electrophoretic imaging process.

Another object of this invention is to provide an imaging system which eliminates the need for the use of a transparent electrode.

Still a further object of this invention is to provide an electrophoretic imaging system having time delay imaging capabilities.

Yet, still a further object of this invention is to provide an electrophoretic imaging system utilizing phosphorescence.

The foregoing objects and others are accomplished in accordance with the present invention generally speaking by providing an imaging system capable of hard copy imaging utilizing electromagnetic radiation produced in response to the excitation of a phosphorescent material. An imaging suspension comprising colored photoelectrophoretic imaging particles in an insulating carrier liquid is interpositioned between at least two electrodes and subjected to an electric field. The suspension is exposed selectively to a phosphorescent energy source which emits radiation as a result of excitation of the respective phosphor coating. The photomigratory particles present in the suspension respond to the emission of electromagnetic radiation from the excited phosphor or phosphorescent coating to form a visible image at one or both of the electrodes. The imaging suspension employs intensely colored pigment particles which serve both as the colorant and as the photosensitive material. Additional photosensitive elements or materials are not required thus providing a very expedient imaging process. The particles respond to light in the regions of the spectrum emitted by the phosphorescent phosphors, for example, cyan, magenta and yellow particles responding to red, green and blue emitted radiation respectively. The expression photoelectrophoretic or photosensitive particle when used refers to the properties of a particle which will migrate under the influence of an applied electric field when exposed to actinic radiation.

It has been determined that phosphorescence brought about by the excitation by electromagnetic radiation, particle bombardment, or by chemical or mechanical action of phosphorescent materials or phosphors may be utilized in conjunction with photoelectrophoretic imaging. Due to the specific stimulus the phosphor is caused to emit light following an appreciable time lag which impinges the electrophoretic suspension such that the particles are activated, respond to the phosphorescent radiation and migrate through the carrier or vehicle so as to produce an image.

BRIEF DESCRIPTION OF THE DRAWINGS

The invention is further illustrated in the accompanying drawings wherein.

DETAILED DESCRIPTION OF THE INVENTION

Figure 1:
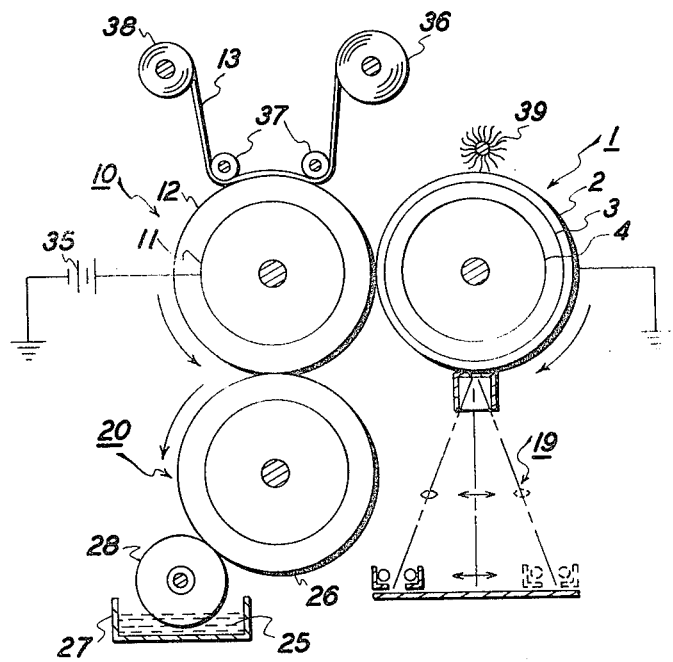
FIG. 1 represents a sectional view of a continuous duplicating apparatus of the present invention.

Referring now to FIG. 1 there is seen a continuous photoelectrophoretic imaging apparatus comprising a phosphorescent electrode 1, an imaging electrode 10 and an ink applicator ensemble generally designated 20. The phosphorescent electrode 1, in the instant illustration, is represented as comprising an optically transparent conductive layer 2, such as tin oxide, and a phosphorescent panel including phosphor layer 3 and an opaque support 4. A uniform layer of the imaging suspension 25 of the present invention is coated on the surface of the imaging electrode 10 by an applicator roller 26 of any suitable design or material, such as a urethane coated cylinder, which applies a film of the suspension supplied from ink sump 27 by way of roller 28 to the respective cylinder. The imaging electrode 10 is stationed in close proximity to the phosphorescent electrode 1 and is made up of a conductive central core 11 which is covered with a layer 12 of material capable of blocking DC current, such as polyurethane. This layer is generally referred to as a blocking layer. Although the latter need not necessarily be used in the system the use of such a layer is preferred so as to eliminate the possiblity of particle oscillation during the process. A detailed description of the improved results and the types of materials which may be employed as the blocking layer may be found in U.S. Pat. No. 3,383,993. A DC power supply 35 is connected to the conductive central core of electrode 10 and the conductive outer layer of the phosphorescent electrode 1 is connected to ground.

The imaging suspension of the present invention will consist of a dispersion of specifically colored, finely divided photosensitive particles in an insulating carrier liquid or vehicle. Depending upon whether or not the system of the present invention is to be utilized to produce a polychromatic or monochromatic image the imaging suspension will contain in the first instance at least two differently colored photosensitive particles and in the latter instance a single color photoresponsive particle or a number of differently colored photoresponsive particles all of which respond to the light to which the suspension is exposed. In either instance the pigment portion of the photoresponsive particle forms both the primary electrically photosensitive ingredient and the primary colorant for the imaging particle. Any suitable differently colored photosensitive pigment particle may be used such as disclosed in U.S. Pat. Nos. 3,384,565 and 3,384,566. If the phosphorescent panel is prepared in such a manner that the phosphors utilized are placed in a random pattern so as to represent the various color ranges of the visible spectrum then it is possible to produce a polychrome image. If desired a polychrome image may be realized according to monochrome imaging in registration utilizing the proper color separation negatives as disclosed in U.S. Pat. application Ser. No. 812,796, filed Apr. 2, 1969, now abandoned, having a common assignee and herein incorporated by reference. The imaging suspension may also contain a sensitizer and/or binder for the specific pigment particles. The percentage of pigment in the carrier is not considered critical; however, for reference purposes it is noted that from about 2 to 10% by weight has been found to produce acceptable results.

The phosphorescent panel 2 is exposed to a light image by way of the image scanning mechanism 19. The image suspension enters the imaging zone between the phosphorescent and imaging electrodes where an image is projected into the nip of the rollers due to the delayed phosphorescence of the phosphorescent layer 3. A field is established across the imaging zone, the general area of contact between the respective electrodes and the imaging suspension, as the result of power source 35. A receiver sheet 13 represented in the form of a paper web is fed from supply roll 36, passes between idler rollers 37 and the imaging electrode and is rewound on take-up roller 38. The image selectively deposited on the imaging electrode is transferred to the receiver sheet 13. Fixing of the image developed on the surface of the copy web 13 may be accelerated by the presence of heating unit (not shown) which assists in vaporizing the carrier component remaining in combination with the imaging pigment particles. A reverse image pattern is formed on the surface of the phosphorescent electrode which is removed by brush 39. The instant illustrated system is primarily concerned with a monochromatic process wherein the image of interest is formed on the surface of electrode 10. In a polychromatic system based on imaging by particle subtraction the image of interest will be that remaining on the phosphorescent electrode and transfer of the image will be realized from this electrode.

Phosphorescence is the emission of electromagnetic radiation resulting from excitation of the phosphorescent material and occurring after such excitation. The excitation may be electromagnetic radiation, by particle bombardment or by chemical or mechanical action. Phosphorescence is distinguished from fluorescence by the fact that there is an appreciable time lag between the excitation and the emission of phosphorescent radiation of from about $10^{-3}$ to about $10^{-8}$ seconds and extending to several hours. Preferably the time lag is of the shorter duration.

Materials which exhibit phosphorescence are termed phosphors. They may be conveniently considered in two groups; the mineral type and the molecular type. In the mineral type the emission of radiation is associated with energy levels, frequently called traps, which are produced in the assembly of molecules, rather than in the individual molecules. The molecular type comprises those in which the energy levels involved in the emission are characteristic of the individual molecules.

The mineral phosphors are normally crystalline. The existence of traps in which electrons displaced from normally occupied levels in the crystal may be held for a time and then released to return to the normal levels provides a mechanism which delayed radiation, i.e., phosphorescence, may be produced. Such electron traps may be produced by the addition of small amounts of extraneous elements, called activators, to pure crystals. A very common example is zinc sulfide with copper as an activator. Mineral phosphors occur in nature, as the name implies, and also are readily synthesized in the laboratory. A wide variety of such phosphors is known. The most common ones are the alkalies and alkaline earths combined as halides, oxides, sulfides, silicates, tungstates, or borates, with activators of copper, silver, gold, or transition elements such as manganese, vanadium, etc. or rare earths.

To produce phosphorescence in this type of phosphor, the excitation process causes the electrons to be raised in energy from normally occupied energy states to unstable higher energy levels from which they then find their way into the electron traps from which they are slowly released. The return to the normal energy levels causes radiation. This phosphorescent radiation may have a half life of milliseconds to hours. This release from the traps may be stimulated, i.e., accelerated, by increased temperature or by radiation with appropriate wavelengths or it may be quenched, i.e. retarded, by radiation of other wavelengths.

The phosphorescence emitted by mineral phosphors is generally spread over a wide wavelength band with maxima at one or more wavelengths. Different phosphors will have different maxima, and these may be anywhere in the spectrum from ultraviolet through the visible range and into the infrared. The spectral distribution of radiation and the amount of radiation depend on the composition of the crystalline material, on the kind and amount of activators, on the presence of impurities, on the physical condition of the phosphor, such as the temperature, on the size of crystalline particles, and in some cases on the kind and amount of excitation.

Molecular phosphorescence occurs when an electron which has been raised from the normally occupied levels of a molecule, i.e. ground states, by excitation, finds its way into a metastable state and subsequently makes a radiation-producing transition back to the ground states. Many organic molecules exhibit this property. These compounds are preferably aromatic amines, carboxylic acids, sulfonic acids, amino sulfonic acids, phenols, etc. Among the large number of such compounds, the following are named to illustrate and not to limit the group of suitable substances: 2-naphthyl-amine-7-sulfonic acid and the corresponding sodium salt; 2-naphthyl-aminoacetyl-7-sulfonic acid; para amino-benzoic acid; para hydroxybenzoic acid; phthalic acid anhydride; terephthalic acid; naphthalene-2-carboxylic acid; 2-naphthylamine-6,8-disulfonic acid; 2-naphthol-6,8-disulfonic acid; fluorene; anthracene; ortho phenylphenol, and the like.

The color of the phosphorescent light depends to a large extent on the ring system of the activating substance. Thus, derivatives of benzene show a blue, those of naphthalene a yellow or green phosphorescence when incorporated in phosphorescent materials. By varying or combining the activating substances, different colors of phosphorescence can be obtained.

The radiation of molecular phosphorescence appears in wavelength bands whose location in the spectrum and whose structure are determined by the energy levels of the individual molecule, usually only moderately modified by the environment of the molecule. These bands are generally narrower than those due to mineral type phosphorescence and they have a more pronounced structure of maxima and minima of radiation. This structure results from the super-position of vibrational energy on the electronic energy of the transition. Rotational structure is usually observed. In addition to the spectral distribution of radiation, molecular phosphorescence is characterized by a life time and by an efficiency of conversion of energy from excitation to phosphorescence.

The imaging suspension of the present invention will consist of specifically colored, finely divided photosensitive particles dispersed in an insulating carrier liquid or vehicle. Any suitable photosensitive pigment particle may be used such as disclosed in U.S. Patent Nos. 3,384,565 and 3,384,566. As above stated, the pigment portion of the photomigratory particle provides both the photosensitivity and coloration for the respective particle. Any suitable insulating carrier liquid may be used in the course of the present invention. Typical insulating carrier liquids include long chain saturated aliphatic hydrocarbons such as decane, dodecane, and tetradecane, kerosene fractions such as Sohio Odorless Solvents available from the Standard Oil Company of Ohio, Isopar G commercially available from the Humble Oil Company of New Jersey and paraffin wax, molten beeswax and other molten thermoplastic materials, mineral oil, linseed oil, olive oil, marine oils such as sperm oil and cod liver oil, silicone oil such as dimethyl polysiloxane (Dow Corning Company), fluorinated hydrocarbons such as Freon and mixtures thereof. The imaging suspension may also contain a sensitizer and/or binder for the pigment particles.

It is to be understood that any suitable photosensitive or photoelectrophoretic pigment particle such as identified in the above cited patents may be employed within the course of the present invention with the selection depending largely upon the photosensitivity and the spectral sensitivity desired. Typical photoresponsive organic materials include substituted and unsubstituted organic pigments such as phthalocyanines, for example, copper phthalocyanine; beta form of metal-free phthalocyanine; tetrachlorophthailocyanine; and x-form of metal-free phthalocyanine; quinacridones as for example 2,9-dimethyl quinacridone; 4,11-dimethyl quinacridone; 3,10-dichloro - 6,13 - dihydro-quinacridone; 2,9-dimethoxy-6,13-dihydro-quinacridone and 2,4,9,11-tetrachloro-quinacridone; anthraquinones such as 1,5-bis-(beta-phenyl-ethylamino) anthraquinone; 1,5-bis-(3′-methoxypropyl-amino) anthraquinone; 1,2,5,6-di (C,C′-diphenyl)-thiazole-anthraquinone; 4 - (2′ - hydroxyphenyl - methoxy-amino) anthraquinone; triazines such as 2,4-diamino-triazine; 2,4 - di - (1′ - anthraquinonyl-amino)-6-(1″-pyrenyl) - triazine; 2,4,6 tri - (1′,1″,1‴-pyrenyl)-triazine azo compounds such as 2,4,6-tris (N-ethyl-N-hydroxy-ethyl-p-aminophenylazo) phyloroglucino; 1,3,5,7-tetrahy-droxy - 2,4,6,8 - tetra (N - methyl - N - hydroxy-ethyl-p-amino - phenylazo) naphthalene; 1,3,5-tri-hydroxy-2,4,6-tri (3′ - nitro - N - methyl - N - hydroxy - methyl - 4′-aminophenylazo) benzene; metal salts and lakes of azo dyes such as calcium lake of 6-bromo-1 (1′-sulfo-2-naphthylazo)-2-naphthol; barium salt of 6-cyano-1 (1′-sulfo-2-naphthylazo)-2-naphthol; calcium lake of 1-(2′-azonaphthaliene - 1′ - sulfonic acid)-2-naphthol; calcium lake of 1-(4′-ethyl-5′-chloroazo-benzene-2′-sulfonic acid)-2-hydroxy-3-napthoic acid; and mixtures thereof. Other organic pigments include polyvinylcarbazole; tri-sodium salt of 2-carboxyl phenyl azo (2-naphthiol-3,6-disulfonic acid; N-isopropyl-carbazole; 3-penzylidene aminocarbazole; 3-aminocarbazole; 1-(4′-methyl-5′-chloro-2′-sulfonic acid) azobenzene-2-hydroxy-3-naphthoic acid; N-2″ pyridyl-8,13-dioxodinaphtho-(2,1-b; 2′,3′-d)-furan-6-carboxamide; 2-amino-5-chloro-p-toluene sulfonic acid and the like.

Typical inorganic photosensitive compositions include cadmium sulfide, cadmium selenide, cadmium sulfoselenide, zinc oxide, zinc sulfide, sulfur, selenium, antimony sulfide, lead oxide, lead sulfide, arsenic sulfide, arsenic-selenium, and alloys and mixtures thereof. The imaging suspension may contain one or more different photosensitive particles each having various ranges of spectral response.

A wide range of voltage may be applied between the electrodes in the system. For good image resolution, high image density and low background it is preferred that the potential applied to be such as to create an electric field of at least about 300 volts per mil across the imaging suspension. For example, when the imaging suspension is coated to a thickness of about 1 mil the electrode spacing will be such that an applied potential of about 300 volts produces a field across the suspension of about 300 volts per mil. Potentials as high as 8,000 volts have been applied to produce images of high quality. As is apparent the applied potential necessary to obtain the desired field of strength will vary depending upon the interelectrode gap as well as the type and thickness of the blocking material utilized. The imaging suspension is generally coated to a thickness of up to about 1 mil or 25 microns, with a preferred operational thickness being in the range of from about 3–5 microns.

As discussed above, a potential is applied across the imaging suspension and as a result of exposure to the phosphorescent radiation the pigment particles initially suspended in the carrier liquid migrate in response to the emitted radiation to produce images at the respective electrode surfaces. The pigment image formed, may be fixed in place, for example by placing a lamination over its top surface such as by spraying with a thermoplastic composition, or by removal of residual solvent aided by the application of heat. When desired, as in the situation where the image is formed on the electrode surface, the image may be transferred to a secondary substrate to which it is in turn fixed, as herein illustrated. The system herein described produces a high contrast monochromatic or polychromatic image.

The resulting pigment image may be formed on a removable paper substrate or sleeve superimposed on or wrapped about the respective electrode or otherwise interpositioned between the electrodes at the site of imaging. The pigment image may then be fixed in place as stated above or the image may be transferred to the surface of a receiver substrate to which it may in turn be fixed. When employed the transfer step may be carried out by adhesive pickoff techniques or preferably by electrostatic field transfer while the image is still wet. The blocking layer itself may be in the form of a removable sleeve in which instance it is simply replaced following imaging with a similar material. When the image is formed on a substrate wrapped about or superimposed on the electrode itself it is only necessary to disengage the substrate from the electrode surface. In the present configuration set out in the illustration, images are produced directly on the electrode surfaces with the image formed on the phosphorescent cylinder removed by the action of a cleaning brush 39. However, if desired, the image formed on the phosphorescent cylinder need not be discarded but may be utilized by offsetting the image from the respective cylinder onto the surface of a conventional receiver sheet, similar to the approach in the instant illustration.

Any suitable material may be used as the receiving substrate for the image produced such as paper or various transparent plastics such as Mylar (polyethylene terephthalate), Tedlar (polyvinylfluoride) or cellulose acetate sheets, the latter particularly if it is desirable to produce a transparency suitable for image projection.

It is to be understood that it is not intended that the structural arrangement of the apparatus represented by FIG. 1 be restricted to the design as set out therein and all similar configurations which will satisfy the requirements of the present invention are contemplated. For example, although the imaging electrode is represented as a cylinder it may also take the form of a flat plate electrode as may the phosphorescent electrode. In the latter instance the process will lend itself to a full-frame exposure system.

The core of the imaging electrode generally will consist of a material which is fairly high in electrical conductivity. Typical conductive materials include conductive rubber and metal foils of steel, aluminum, copper and brass. Preferably, as stated, the core of the electrode will have a high electrical conductivity in order to establish the required field differential in the system. However, if a material having a low conductivity is used a separate electrical connection may be made to the back of the blocking layer of the imaging electrode. If a hard rubber non-conductive core, for example, is used then a metal foil may be used as a backing for the blocking sleeve. Although as stated above the blocking layer is not necessarily required in the system the use of such a layer is preferred because of the markedly improved results which it is capable of producing. It is preferred that the blocking layer when used be either an insulator or a semiconductor which will not allow for the passage of sufficient charge carriers under the influence of the existing field into the imaging particles so as to minimize or completely eliminate particle oscillation in the system. The result is enhanced image density and resolution. Exemplary of blocking materials are baryta paper, polyvinyl fluoride, polyethylene terephthalate and polyurethane. Other suitable materials having a resistivity of about $10^7$ ohms-cm. or greater may be employed. Typical materials in this resistivity range include cellulose acetate coated papers, cellophane, polystyrene and polytetrafluoroethylene.

Figures 2, 3:
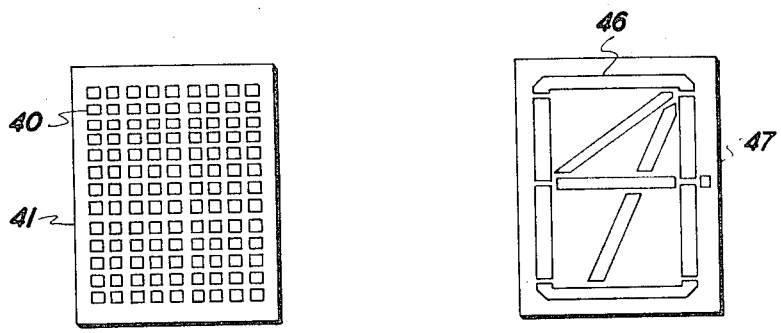
FIGS. 2, 3, and 4 represent various forms of exemplary phosphorescent panels of the present invention.

The phosphorescent panels of the present invention may be constructed in any one of a number of different ways depending upon the specific application, with it generally being preferable to construct the phosphorescent panel with multiple phosphors which emit radiation in varied portions of the electromagnetic spectrum. This provides for flexibility in that the particular panel may then be used in conjunction with either a monochromatic or polychromatic system. Upon energizing selected areas following a time delay recognizable letters and numerals will be formed of phosphorescent radiation. The panel may take the form of a multiphosphor plate as illustrated in FIG. 2 with the phosphor sites 40 uniformly dispersed on the surface of a support member 41. A panel of this nature could, for example, be used in a system as set out in FIG. 1. The phosphorescent material will selectively emit radiation in response to a particular stimuli, generally in the instant application electromagnetic radiation, which in turn is converted into a hard copy image in accordance with the above described process. The phosphorescent panel may be designed so as to produce a fixed image display as in FIG. 3 wherein the phosphorescent material 46 on support 47 is coated so as to provide a fixed form of output information upon uniform activation such as exposure uniformly to electromagnetic radiation.

Figure 4:
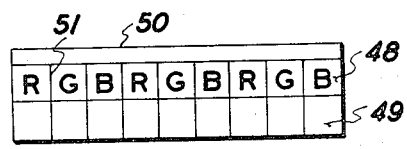

One method of using the system of the present invention in conjunction with a color imaging process is by providing a phosphorescent panel as in FIG. 4 made up of a plurality of narrow strips of phosphorescent materials 48 placed side by side. The color in the image may be produced by having the phosphorescent elements produce the primary colors directly or the phosphorescent material may produce white light with strip filters used to separate the desired primary colors. As represented in FIG. 4 narrow strips of phosphorescent material 48 capable of producing red (R), green (G) and blue (B) light respectively are superimposed upon a substrate identified as 49. A thin conductive optically transparent layer 50 overlays the remaining surface of the phosphorescent material to complete the electrode. The phosphorescent electrode will respond to the specific stimuli to emit the wavelength or color of light characteristic of the specific phosphor. For example, yellow or green light may be produced by a phosphor made of derivatives of naphthalene, and blue light may be produced by derivatives of benzene. Thus the phosphor is seen to phosphoresce in direct response to the particular stimulus. Further, the emission of certain phosphors lies in the ultraviolet and infrared regions of the spectrum thus providing a process for imaging utilizing radiation outside the visible spectrum. In such an instance the photoelectrophoretic particle present in the imaging suspension must be sensitive to the specific emitted radiation. Phthalocyanines, for example, will respond to infrared radiation in a manner required by the present invention. The phosphorescent strips of FIG. 4 are separated by a thin light barrier 51 which prevents light spill over between adjacent strips which improves resolution. This barrier may be made of any suitable opaque material, such as silver or gold foil, may be conductive or non-conductive, and should be as thin as possible. A fourth type of phosphor capable of emitting white light may also be included in the panel.

Any suitable material may be used as the support substrate of the phosphorescent panel such as aluminum, copper, Mylar (polyethylene terephthalate), Tedlar (polyvinylfluoride), etc. Selection generally will be dictated by whether or not the process is to be operated on a flexible or non-flexible basis. Furthermore, when used in an apparatus as set out in FIG. 1, any suitable optically transparent conductive material such as thin layers of tin oxide, copper, copper iodide, gold or the like may be used as the conductive over-coating for the phosphor layer. Other materials including many semi-conductive materials such as cellophane, polyvinyl fluoride, polyvinyl alcohol and polyvinylacetate films which are ordinarily not thought of as being conductive have been found suitable.

PREFERRED EMBODIMENTS

To further define the specifics of the present invention the following examples are intended to illustrate but not limit the particulars of the present system. Parts and percentages are by weight unless otherwise indicated.

In the following examples a phosphorescent panel comprising a flexible tape of plastic on which is coated a specific phosphorescent material is provided. The imaging electrode utilized consists of a 3½ inch diameter conductive steel core with a ¼ inch layer of polyurethane formulating the blocking layer.

Example I

A cyan ink suspension consisting of 4 grams X-form phthalocyanine, 2 grams tri-cresyl phosphate (TCP), .05 grams beta carotene and about 160 cc. mineral oil is applied to a phosphorescent panel from a urethane sponge. The film of imaging suspension is metered to a thickness of about 3 microns. The phosphor is a copper activated ZnS material available from Sylvania. The phosphorescent panel is exposed to a photographic negative by way of an incandescent light source. The imaging electrode is then passed across the imaging suspension while a potential of about +7,000 volts is applied. As a result of the phosphorescent radiation emitted from the panel the cyan pigment particles are selectively deposited on the surface of the imaging electrode. The X-phthalocyanine is prepared according to the process set out in U.S. Pat. No. 3,357,989 issued Dec. 12, 1967. The images produced are surprisingly sharp.

Example II

The process of Example I is repeated with the exception of the utilization of a magenta ink suspension consisting of 8 grams of Watchung Red B, 1-(4'-methyl-5'-chloro-azobenzene-2'-sulfonic acid)-2-hydroxy-3-naphthoic acid (CI15865), 2 grams of TCP and 100 cc. of sperm oil in place of the cyan suspension. The film is coated to a thickness of about 4 microns. The phosphor utilized is manganese activated calcium halophosphate ($3Ca_3(PO_4)_2$). The potential applied during imaging to the imaging electrode is about +8,000 volts. A magenta image is formed on the surface of the imaging electrode.

Example III

The process of Example I is repeated with the exception of the substitution of a yellow ink suspension comprising 20 grams N-2''-pyridyl-8,13-dioxodinaphtho-(2,1-b; 2',3'-d)-furan-6-carboxamide, 2 grams of TCP, .05 gram beta carotene and 106 cc. Sohio Odorless Solvent for the cyan imaging suspension. The phosphor utilized is antimony activated calcium halophosphate. The yellow pigment is commercially available from the Sheperd Chemical Company. Again, a yellow image is produced on the surface of the imaging electrode.

Although the present examples are specific in terms of conditions and materials used any of the above materials may be substituted when suitable with similar results being obtained. In addition to the steps used to carry out the process of the present invention other steps or modifications may be used if desirable. For example the phosphor electrode could be uniformly pre-inked and exposure made through the ink film at a wavelength of high ink transmission. Re-emission of energy at a longer wavelength from the phosphors would then cause subsequent pigment migration. In addition, other materials may be incorporated in the imaging suspension, various voltages may be applied, film thicknesses utilized, and phosphorescent materials used in a manner so as to synergize or otherwise desirably effect the properties of the present system. For example, various sensitizers may be included in the imaging suspension which will enhance the final results.

Those skilled in the art will have other modifications occur to them based on the teachings of the present invention. These modifications are intended to be encompassed within the scope of this invention.

What is claimed is:

1. A method of photoelectrophoretic imaging comprising the steps of:
   (a) providing a layer of phosphorescent material comprising at least two phosphorescent materials capable of emitting radiation in at least two distinct ranges of visible radiation;
   (b) exposing said phosphorescent layer to radiation which causes said layer of phosphorescent material to emit a pattern of radiation of at least two distinct ranges of visible radiation;
   (c) exposing a layer of an imaging suspension comprising at least two electrically photosensitive pigment materials in an insulating carrier liquid to said pattern of radiation, each different pigment being responsive to separate distinct range of visible radiation; and,
   (d) applying an electrical field across said imaging suspension until an image is formed.

2. The method of claim 1 wherein said layer of phosphorescent material is provided on the surface of an electrode.

3. The method of claim 1 wherein said layer of imaging suspension is provided on the surface of a transparent electrode and said suspension is exposed to radiation emitted from said phosphorescent material through said transparent electrode.

4. The method of claim 1 wherein said phosphorescent material comprises materials capable of emitting red, green and blue light and said imaging suspension contains cyan particles responsive mainly to red light, magenta particles responsive mainly to green light and yellow particles responsive mainly to blue light.

References Cited

UNITED STATES PATENTS

| Number | Date | Name | Class |
|---|---|---|---|
| 3,384,565 | 5/1968 | Tulogin et al. | 204—181 |
| 3,278,302 | 10/1966 | Gundloch | 96—1 |
| 2,973,408 | 2/1961 | Hirsch | 178—89 |
| 3,409,901 | 11/1968 | Dost et al. | 346—74 |
| 3,364,020 | 1/1968 | Fehlberg et al. | 96—1 |
| 3,094,910 | 6/1963 | Van Wagner et al. | 95—1.7 |
| 3,258,525 | 6/1966 | Piatt et al. | 178—5.4 |
| 3,427,242 | 2/1969 | Mihajlov | 204—300 |
| 3,535,111 | 10/1970 | Pope | 96—1 |
| 3,550,095 | 12/1970 | Kohashi | 340—173 |
| 3,576,583 | 4/1971 | Uno | 346—74 |

GEORGE F. LESMES, Primary Examiner

J. G. COOPER III, Assistant Examiner

U.S. Cl. X.R.

96—1 R, 1.2, 1.3; 204—300; 250—65; 315—10